(12) United States Patent
Qi et al.

(10) Patent No.: US 11,760,567 B2
(45) Date of Patent: Sep. 19, 2023

(54) MATERIAL LOADING DEVICE

(71) Applicant: TRIPLE WIN TECHNOLOGY(SHENZHEN) CO.LTD., Shenzhen (CN)

(72) Inventors: Wei-Wei Qi, Guangdong (CN); Jin-Hong Li, Shenzhen (CN); Shi-Hong Yang, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 17/830,514

(22) Filed: Jun. 2, 2022

(65) Prior Publication Data

US 2022/0402693 A1    Dec. 22, 2022

(30) Foreign Application Priority Data

Jun. 16, 2021   (CN) .......................... 202110666474.X

(51) Int. Cl.
*B65G 1/02*    (2006.01)
*B65D 25/28*    (2006.01)
*B65D 6/06*    (2006.01)

(52) U.S. Cl.
CPC ................. *B65G 1/02* (2013.01); *B65D 7/10* (2013.01); *B65D 25/2858* (2013.01)

(58) Field of Classification Search
CPC ........ B65G 1/02; B65D 25/2858; B65D 7/10; E05B 65/463; E05B 65/467; E05C 19/00
See application file for complete search history.

(56) References Cited

U.S. PATENT DOCUMENTS

| | | | | |
|---|---|---|---|---|
| 6,722,749 | B1 * | 4/2004 | Pagac | E05B 65/463 312/221 |
| 7,410,227 | B2 * | 8/2008 | Liao | E05B 65/463 312/221 |
| 8,696,074 | B2 * | 4/2014 | Romaen | E05B 65/464 312/215 |
| 2005/0040659 | A1 * | 2/2005 | Baker | E05B 65/463 292/338 |

FOREIGN PATENT DOCUMENTS

CN    112298764 A    2/2021
TW    M376866    *  3/2010

* cited by examiner

*Primary Examiner* — Ko H Chan
(74) *Attorney, Agent, or Firm* — ScienBiziP, P.C.

(57) ABSTRACT

A material loading device includes a loading frame and at least one first locking mechanism. The loading frame defines a receiving cavity and at least one opening communicating with the receiving cavity. Opposing inner walls of the loading frame define a plurality of first slots. The at least one first locking mechanism is disposed at the at least one opening. The at least one first locking mechanism includes a first locking portion extending downwards. The first locking portion includes a plurality of second slots and a plurality of blocks adjacent to the plurality of second slots. The first locking portion can drop by gravity, driving the plurality of blocks to move to and lock the plurality of first slots. The first locking portion can also be lifted, to drive the plurality of second slots to move to and unlock the plurality of first slots.

14 Claims, 6 Drawing Sheets

MATERIAL LOADING DEVICE

FIELD

The subject matter relates to material transporting mechanisms, and more particularly, to a material loading device.

BACKGROUND

During production, raw materials may be transported by a loading box. The loading box has a mechanical clip.

However, the mechanical clip needs to be manually opened and closed by an operator. When the raw materials have been loaded into the loading box, the operator may forget to close the mechanical clip, causing the raw materials in the loading box to escape during transportation. Furthermore, if the operator forgets to open the mechanical clip when the loading box is working with a loading and unloading device, the loading box may be upset or damaged by the loading and unloading device.

BRIEF DESCRIPTION OF THE DRAWINGS

Implementations of the present technology will now be described, by way of example only, with reference to the attached figures.

DETAILED DESCRIPTION

Figure 1:
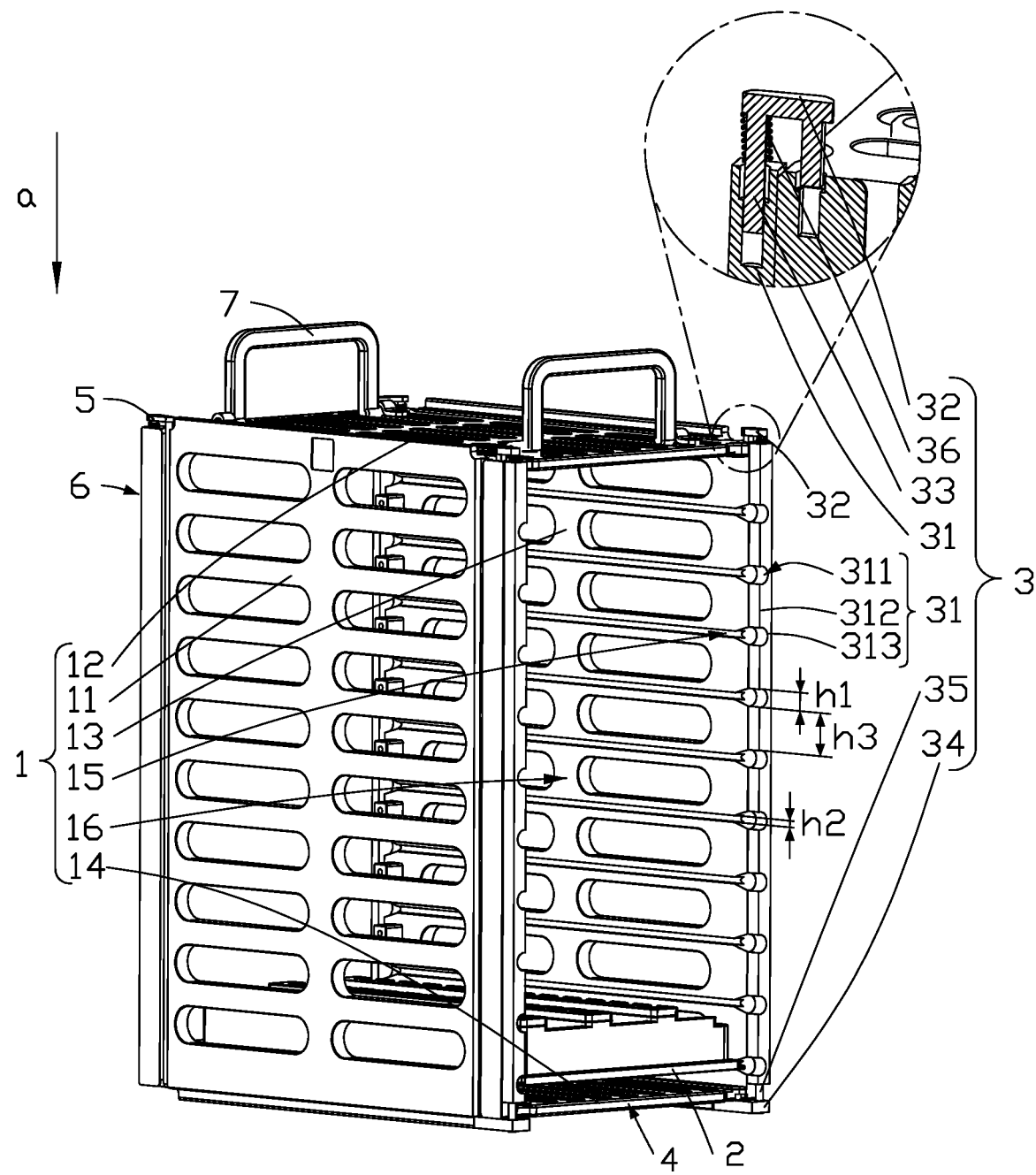
FIG. 1 is a diagrammatic view of an embodiment of a material loading device according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant characteristic being described. Also, the description is not to be considered as limiting the scope of the embodiments described herein. The drawings are not necessarily to scale, and the proportions of certain parts may be exaggerated to better illustrate details and characteristics of the present disclosure.

The term "comprising," when utilized, means "including, but not necessarily limited to"; it specifically indicates open-ended inclusion or membership in the so-described combination, group, series, and the like.

Figure 2:
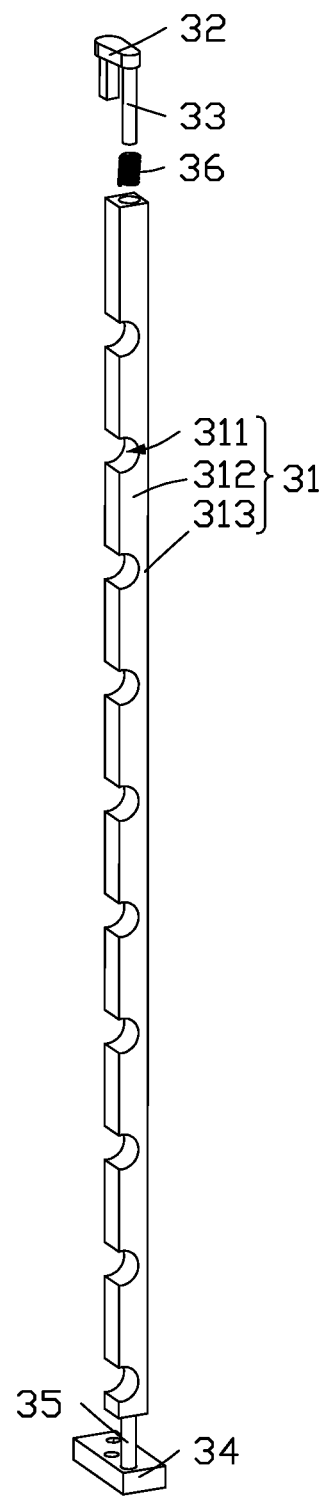
FIG. 2 is a diagrammatic view of an embodiment of a first locking mechanism of the material loading device of FIG. 1.
Figure 3:
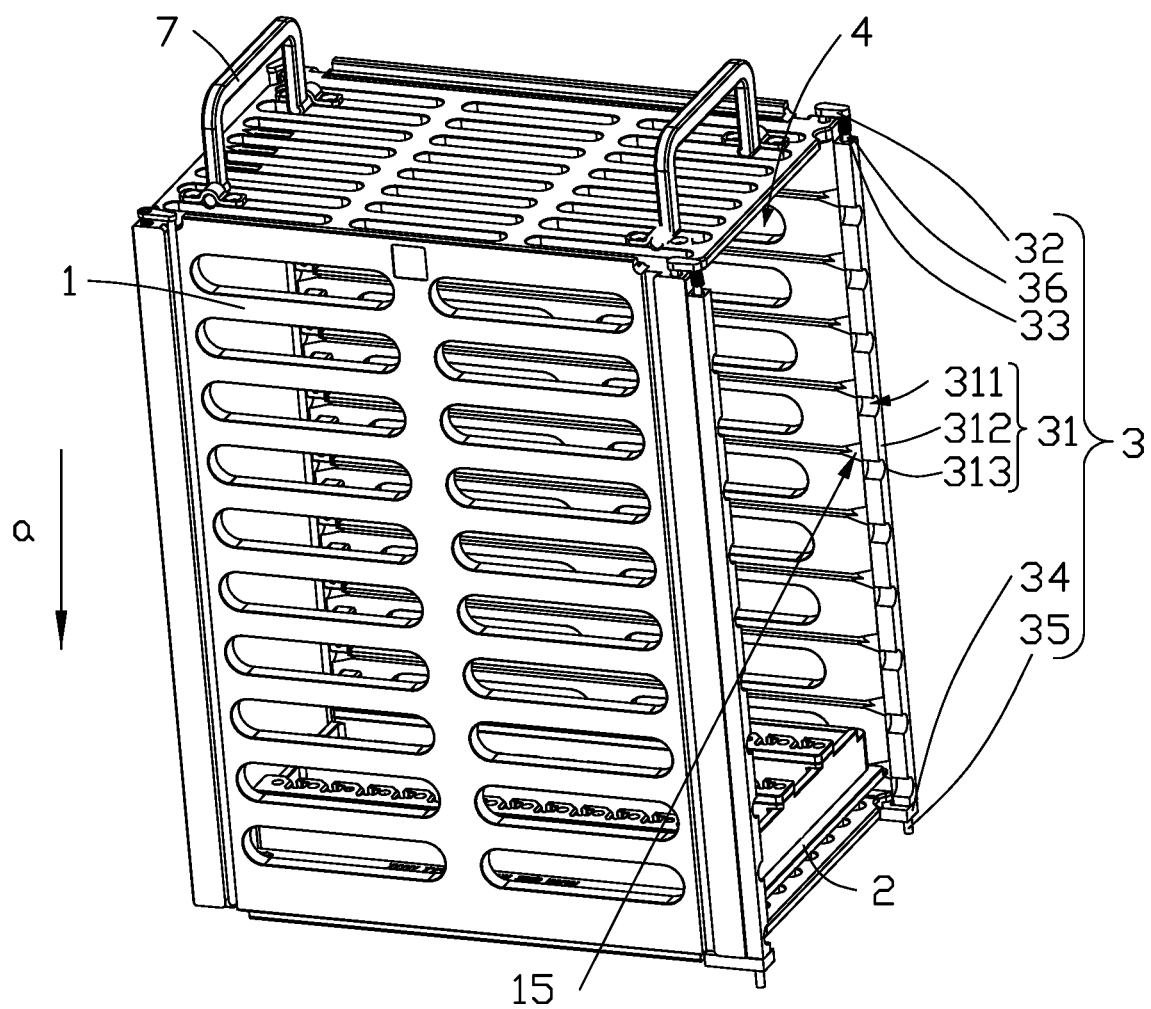
FIG. 3 is a diagrammatic view showing the first locking mechanism locking the material loading device of FIG. 1.

FIGS. 1 to 3 illustrate an embodiment of a material loading device 100, which includes a loading frame 1 and at least one first locking mechanism 3. The loading frame 1 defines a receiving cavity 16 and at least one opening 4 communicating with the receiving cavity 16. The receiving cavity 16 is used to receive materials. The at least one first locking mechanism 3 is movably coupled to the loading frame 1 at the at least one opening 4. The material loading device 100 further includes a plurality of loading plates 2, which are used to carry materials. Two opposite inner walls of the loading frame 1 define a plurality of first slots 15. Two sides of each of the loading plates 2 are inserted into the first slots 15 on the two opposite inner walls, and the first locking mechanism 3 resists against the loading plates 2 inserted into the first slots 15. The loading plate 2 enters and exits the loading frame 1 through the opening 4. The loading plates 2 received in the first slots 15 allow a fixed parallel arrangement of the materials on the loading plates 2 in the receiving cavity 16.

Referring to FIGS. 1 and 2, the first locking mechanism 3 includes a first locking portion 31 extending downwards (direction of gravity, defined as "a"). The first locking portion 31 includes a plurality of second slots 311 and a block 312 adjacent to each second slot 311. The first locking portion 31 can drop in the gravity direction "a" under an action of gravity, so as to move the blocks 312 to the corresponding first slots 15 to lock the loading plates 2. Or, the first locking portion 31 can be driven upwards, to move opposite to the gravity direction "a" to move the second slots 311 to the corresponding first slots 15 to unlock the loading plates 2.

Referring to FIG. 1, the loading frame 1 is substantially a rectangular parallelepiped structure formed by a first side plate 11, a second side plate 13, a top plate 12, and a bottom plate 14. The first side plate 11 is parallel to the second side plate 13. The bottom plate 14 is opposite to the top plate 12. The first side plate 11, the top plate 12, the second side plate 13, and the bottom plate 14 are connected to each other in that order to define the receiving cavity 16 and the opening 4. The inner walls of the first side plate 11 and the second side plate 13 define the plurality of first slots 15. The first slots 15 on the first side plate 11 are opposite to the first slots 15 on the second side plate 13. One loading plate 2 can be loaded on two opposite first slots 15 and kept horizontal.

Referring to FIG. 1, in an embodiment, the first side plate 11, the top plate 12, the second side plate 13, and the bottom plate 14 define two openings 4 and 6. The two openings 4 and 6 are disposed on opposite ends of the loading frame 1. The first locking portion 31 is disposed on the first side plate 11 and/or the second side plate 13 at the opening 4.

In an embodiment, the first locking portion 31 is disposed on one end, along an extending direction of the first slot 15 on the first side plate 11 and/or the second side plate 13.

In an embodiment, the loading frame 1 is made of metal.

Referring to FIG. 1, one block 312 is located above one second slot 311, and the second slots 311 are located at the end of the first slots 15. At this time, the first slot 15 is unlocked. When the first locking portion 31 moves down under the action of gravity, causing the second slots 311 to move down and leave the first slots 15, the blocks 312 are moved to the first slots 15 to lock the first slots 15.

In an embodiment, along the gravity direction "a", a height (defined as "h1") of a cross-section of the second slot 311 is larger than or equal to a height (defined as "h2") of a cross-section of the first slot 15. The height "h1" of the second slot 311 allows easy insertion and removal of the loading plate 2 from the first slot 15. A height (defined as "h3") of a cross-section of the block 312 is larger than or equal to the height "h2" of the first slot 15. The height "h3" of the block 312 allows easy locking and blocking of the first slot 15 when locking the loading plate 2, for stability during carriage.

In an embodiment, a structure of the first locking portion 31 is substantially rectangular. The first locking portion 31 further includes a connecting strip 313. Each block 312 is disposed on the connecting strip 313. A region between two adjacent blocks 312 forms the second slot 311.

In an embodiment, the second slot 311 is substantially arc-shaped or rectangular, and can also be other shapes.

Referring to FIGS. 1 to 3, the first locking mechanism 3 further includes a first fixing portion 32 disposed on a top of the first side plate 11 and/or a top of the second side plate 13, a first guide rod 33 disposed on the first fixing portion 32, a second fixing portion 34 disposed on a bottom portion of the first side plate 11 and/or a bottom portion of the second side plate 13, and a second guide rod 35 disposed at an end of the first locking portion 31 away from the first fixing portion 32. An end of the first locking portion 31 close to the first fixing portion 32 is sleeved on the first guide rod 33. The first locking portion 31 can move along the first guide rod 33. The second guide rod 35 penetrates the second fixing portion 34. The second guide rod 35 is used to move downwards (along the gravity direction "a"), and upwards as required, relative to the second fixing portion 34. The first fixing portion 32 and the second fixing portion 34 are used to limit a moving distance of the first locking portion 31 to prevent the first locking portion 31 separating from the opening 4, which gives increased stability to the first locking mechanism 3.

In an embodiment, when the first slot 15 is locked, one end of the second guide rod 35 away from the first locking portion 31 goes beyond the bottom surface of the loading frame 1, as shown in FIG. 3. When the first slot 15 is unlocked, the one end of the second guide rod 35 away from the first locking portion 31 is flush with the bottom surface of the loading frame 1, as shown in FIG. 1. In this way, when the material loading device 100 is subsequently placed on a horizontal surface, the horizontal surface automatically pushes the second guide rod 35 upward, in an unlocking process.

Referring to FIGS. 1 to 3, the first locking mechanism 3 further includes a first elastic member 36 sleeved on the first guide rod 33. The ends of the first elastic member 36 abut against the first fixing portion 32 and the first locking portion 31. When the first locking portion 31 moves upwards to unlock the first slot 15, the first elastic member 36 is compressed. In this way, after lifting the loading frame 1, the first locking portion 31 drops and is also driven by the elastic restoring force of the first elastic member 36 to move downwards. Thus, the blocks 312 move to the first slots 15 and instantaneously lock the first slots 15. Moreover, during a movement of the loading frame 1, the first slots 15 and the first locking portion 31 cannot be accidentally opened due to the force of the first elastic member 36. The locking stability of the first locking mechanism 3 is improved.

In an embodiment, the first elastic member 36 is a spring.

In an embodiment, when the material loading device 100 is placed on the horizontal surface, or when the material loading device 100 is lifted away from the horizontal surface, the first side plate 11 and the second side plate 13 are substantially perpendicular to the horizontal surface.

In an embodiment, there are two first locking mechanisms 3. The two first locking mechanisms 3 are arranged on the first side plate 11 and the second side plate 13 corresponding to the opening 4. The locking of the loading plate 2 in opposite first slots 15 is more stable when the first locking portions 31 are disposed at the opposite first slots 15.

Referring to FIGS. 1 to 3, in use, when the material loading device 100 is lifted, the first locking portion 31 is driven to move downwards (along the gravity direction "a") under the action of gravity and the elastic restoring force of the first elastic member 36. Thus, the blocks 312 are driven to move to the first slots 15 to lock the loading plate 2, as shown in FIG. 3. When the material loading device 100 is placed on a horizontal surface, the second guide rod 35 is pushed up by the surface, thus driving the first locking portion 31 to move upwards. Thus, the blocks 312 leave the first slots 15, and the second slots 311 move to the first slots 15 to open the first slots 15 and unlock the loading plates 2 in the first slots 15, as shown in FIG. 1.

Referring to FIG. 1, when opposite ends of the loading frame 1 of the material loading device 100 need to be opened at the same time in some situations, the loading frame 1 needs the two openings 4 and 6. Each of the opening 4 and the opening 6 is provided with at least one first locking mechanism 3.

In an embodiment, two first locking mechanisms 3 are disposed at the opening 4.

Figure 4:
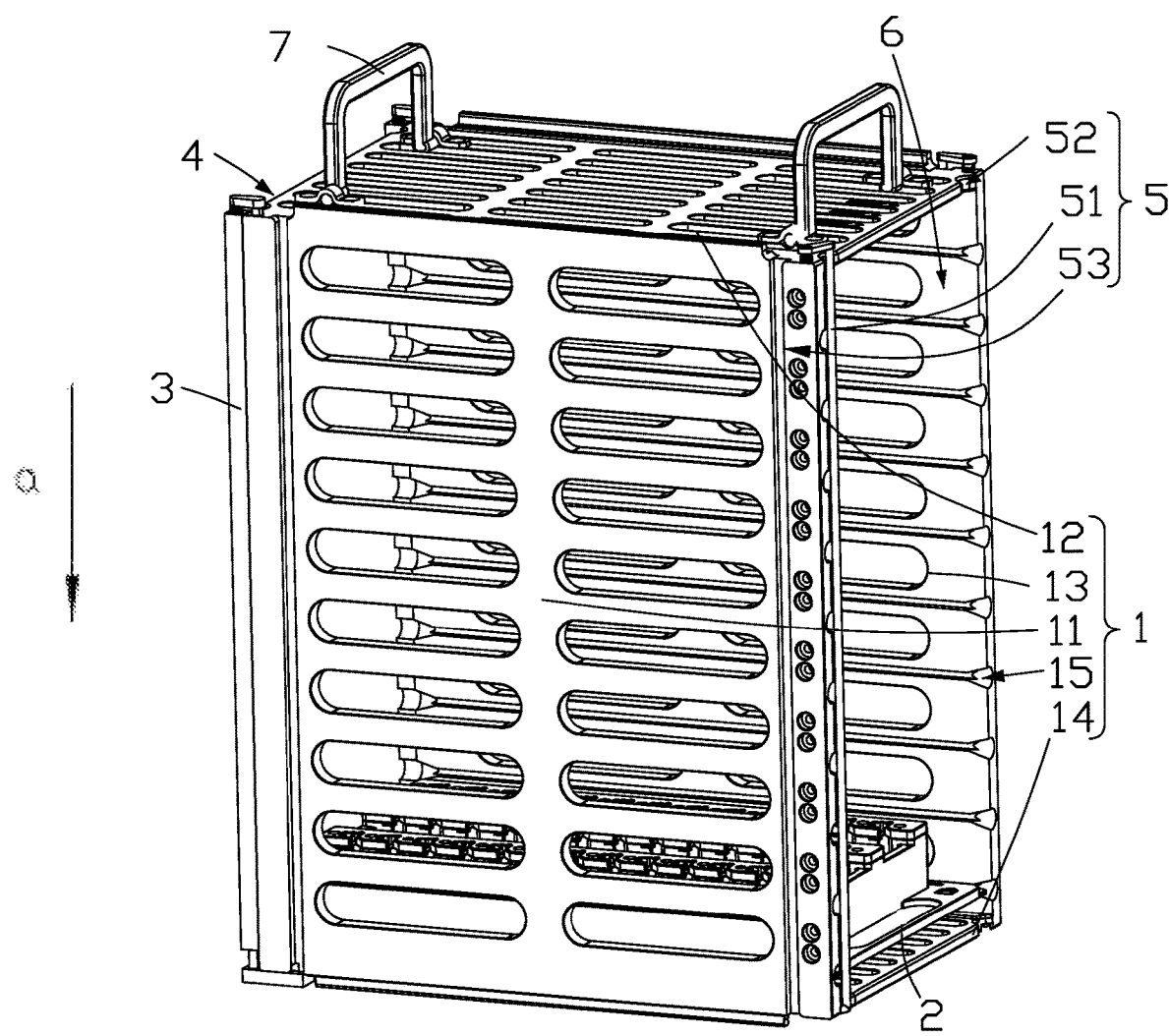
FIG. 4 is similar to FIG. 1, but showing the material loading device from another angle.
Figure 5:
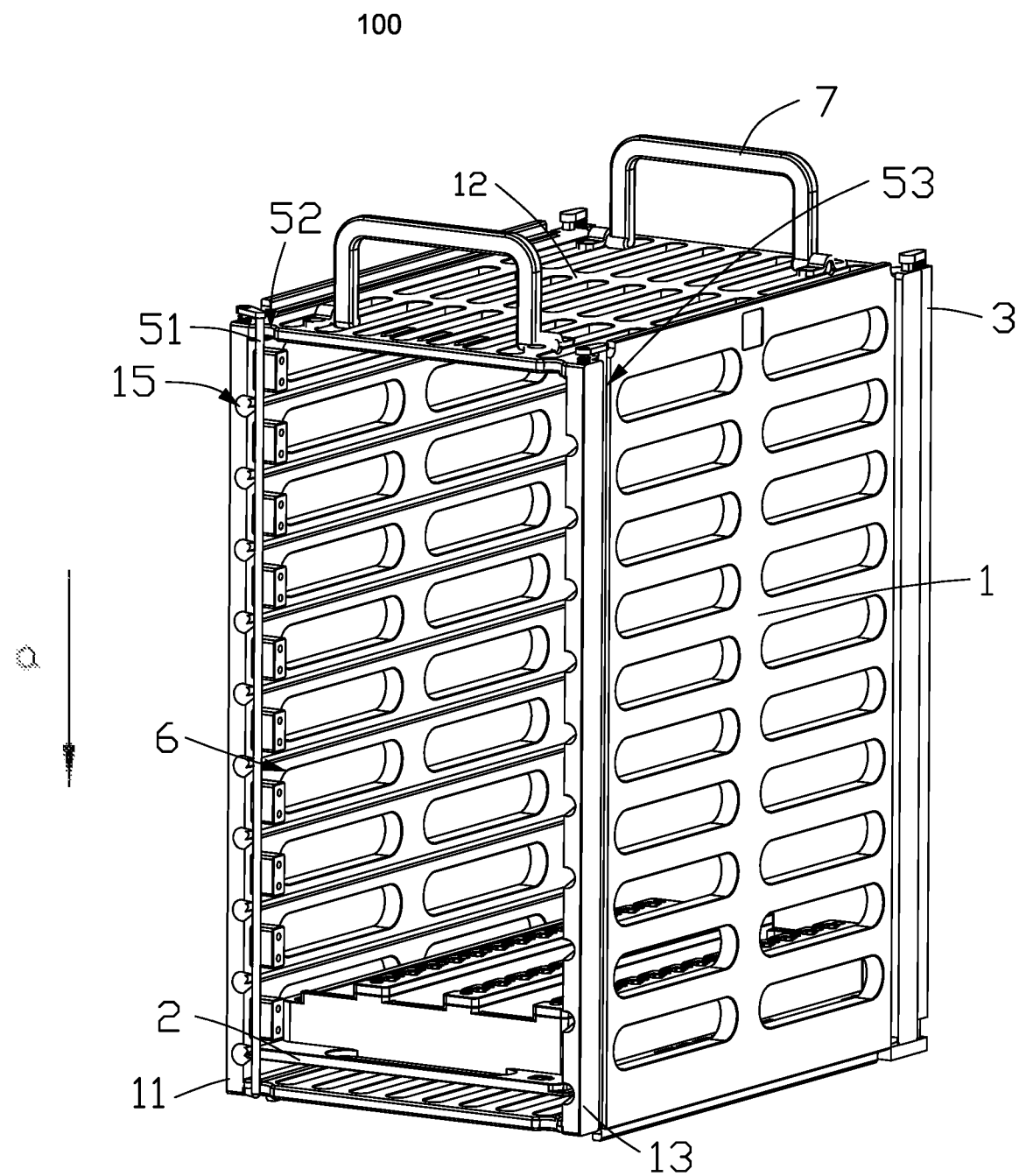
FIG. 5 is similar to FIG. 1, but showing the material loading device from yet another angle.
Figure 6:
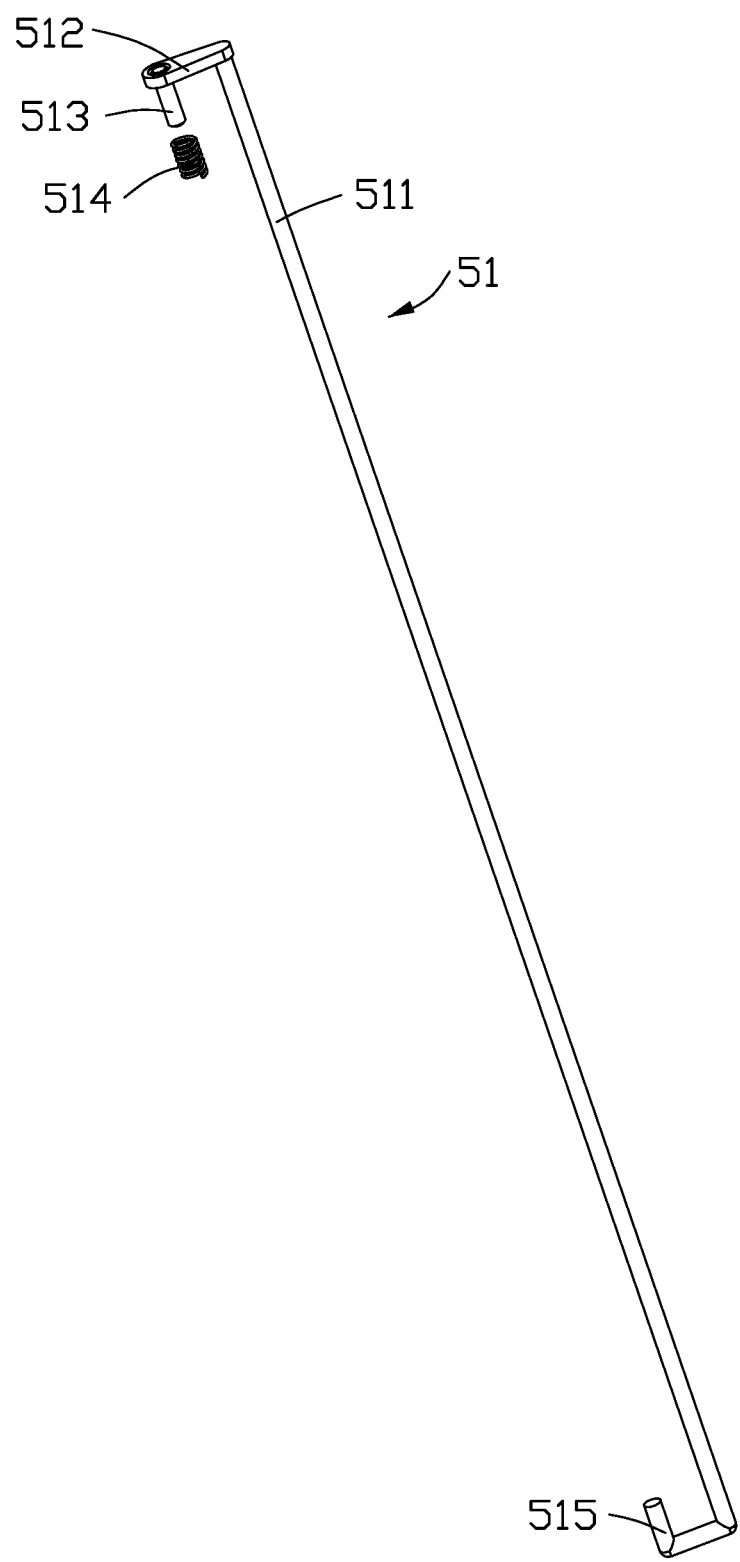
FIG. 6 is a diagrammatic view of an embodiment of a second locking mechanism of the material loading device of FIG. 1.

Referring to FIGS. 4 to 6, the material loading device 100 further includes at least one second locking mechanism 5. The at least one second locking mechanism 5 is disposed at the opening 6 away from the first locking mechanism 3.

In an embodiment, the second locking mechanism 5 is a manual locking mechanism. The second locking mechanism 5 is used to lock and unlock the first slots 15 manually. The opening 4 of the material loading device 100 is automatically locked or automatically opened, and the opposite opening 6 of the material loading device 100 is manually locked or manually opened. Thus, the openings 4 and 6 of the material loading device 100 can connect to other machines, and prevent the loading plate from exceeding a track of the first slot 15 when placing the loading plate in the first slot 15 in a fool-proofing manner.

Referring to FIGS. 4 to 6, the second locking mechanism 5 includes a second locking portion 51 extending along the gravity direction "a", a first clamping groove 52 disposed on the loading frame 1 close to the opening 6, and a second clamping groove 53 disposed on the loading frame 1 away from the opening 6. The second locking portion 51 is used to clamp on the first clamping groove 52 or the second clamping groove 53 to lock or unlock the first slots 15.

In an embodiment, the second locking portion 51 includes a locking rod 511 extending along the gravity direction "a", a fixing member 512 disposed at one end of the locking rod 511 close to the top plate 12, a rotating shaft 513 connected to the fixing member 512 and the loading frame 1, a second elastic member 514 sleeved on the rotating shaft 513, and a rotating portion 515 disposed on one end of the locking rod 511 close to the bottom plate 14. The rotating portion 515 is rotationally connected to the loading frame 1. The fixing member 512 is used to drive the locking rod 511 to rotate around the rotating shaft 513, so as to make the locking rod 511 snap into the first clamping groove 52 or into the second clamping groove 53, to lock or unlock the first slots 15. In use, the locking rod 511 can be manipulated around the rotating shaft 513, and rotated to the side of the first slots 15 close to the opening 6, to snap into the first clamping groove 52 to lock the first slots 15. Or, the locking rod 511 can be manipulated around the rotating shaft 513, and rotated to the side of the first slots 15 away from the opening 6, and snapped into the second clamping groove 53 to unlock the first slots 15.

Referring to FIGS. 4 to 6, in an embodiment, the rotating portion 515 and the locking rod 511 are integrated. A structure of the rotating portion 515 is roughly the shape of a "U". One end of the rotating portion 515 is connected to the locking rod 511, and the other end is rotationally fixed on the loading frame 1. The locking rod 511 with the U-shaped structure allows easy manipulation and rotation.

In an embodiment, two second locking mechanisms 5 are disposed on the first side plate 11 and the second side plate 13 close to the opening 6. Two bottom portions of the first side plate 11 and the second side plate 13 extend downward to block the bottom of the two rotating portions 515. After the rotating portion 515 and the locking rod 511 are snapped into the first clamping groove 52 or into the second clamping groove 53, the rotating portion 515 will be blocked by the bottoms of the first side plate 11 and the second side plate 13. Thus, the locking rod 511 will not be automatically released from the first or second clamping groove 52 or 53. The locking stability of the second locking mechanism 5 is improved.

In an embodiment, the second elastic member 514 can be a spring. One end of the second elastic member 514 abuts the fixing member 512 and the other end abuts the locking rod 511. The tightness of the second locking portion 51 during locking or unlocking of the first slots 15 is improved, automatic disengagement of the locking rod 511 from the first or second clamping groove 52 or 53 is avoided, and the stability of the second locking portion 51 is improved.

Referring to FIG. 1, the material loading device 100 further includes a lifting and carrying handle 7 disposed on the loading frame 1.

Compared with the related art, a transportation efficiency and stability of the material loading device 100 is improved. The first locking mechanism 3 is self-locking by gravity, automatically opening and closing the loading frame 1. The first locking mechanism 3 can prevent the loading plates 2 in the loading frame 1 from falling out, and prevent the loading frame 1 from tilting or falling. Moreover, the gravity self-locking operation is convenient, the design of the first locking mechanism 3 is simple, there is no need to connect and power a driving mechanism, and the cost is low. The first locking mechanism 3 is convenient for disassembly and maintenance, and the first locking mechanism 3 is universal and applicable to a variety of material loading devices.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including, the full extent established by the broad general meaning of the terms used in the claims.

What is claimed is:

1. A material loading device, comprising:
a loading frame defining a receiving cavity and at least one opening communicating with the receiving cavity, wherein the receiving cavity is configured to receive materials, two opposite inner walls of the loading frame define a plurality of first slots; and
at least one first locking mechanism disposed at the at least one opening, the at least one first locking mechanism comprising a first locking portion extending along a gravity direction, the first locking portion comprising a plurality of second slots and a plurality of blocks adjacent to the plurality of second slots,
wherein the first locking portion is configured to move along the gravity direction under an action of gravity to drive the plurality of blocks to move to and lock the plurality of first slots; or, the first locking portion is configured to move in an opposite direction of the gravity direction to drive the plurality of second slots to move to and unlock the plurality of first slots,
along the gravity direction, a height of a cross-section of each of the plurality of second slots is larger than or equal to a height of a cross-section of each of the plurality of first slots; a height of a cross-section of each of the plurality of blocks is larger than or equal to the height of the cross-section of each of the plurality of first slots.

2. The material loading device of claim 1, wherein the loading frame comprises a first side plate, a second side plate, a top plate, and a bottom plate, the first side plate is parallel to the second side plate, the bottom plate is opposite to the top plate; the first side plate, the top plate, the second side plate, and the bottom plate are connected to each other in that order to define the receiving cavity and the at least one opening, the plurality of first slots is defined on the inner walls of the first side plate and the second side plate.

3. The material loading device of claim 2, wherein the at least one first locking mechanism is disposed on the first side plate and/or the second side plate at the at least one opening.

4. The material loading device of claim 3, wherein the at least one first locking mechanism further comprises a first fixing portion disposed on a top portion of the first side plate and/or a top portion of the second side plate, a first guide rod disposed on the first fixing portion, a second fixing portion disposed on a bottom portion of the first side plate and/or a bottom portion of the second side plate, and a second guide rod disposed at an end of the first locking portion away from the first fixing portion, an end of the first locking portion close to the first fixing portion is sleeved on the first guide rod, the first locking portion is configured to move along the first guide rod, the second guide rod penetrates through the second fixing portion, the second guide rod is configured to move along the gravity direction and the opposite direction of the gravity direction relative to the second fixing portion;
when the plurality of first slots is locked, one end of the second guide rod away from the first locking portion extends out from a bottom surface of the loading frame, when the plurality of first slots is unlocked, the one end of the second guide rod away from the first locking portion is flush with the bottom surface of the loading frame.

5. The material loading device of claim 4, wherein the at least one first locking mechanism further comprises a first elastic member sleeved on the first guide rod, both ends of the first elastic member respectively abut against the first fixing portion and the first locking portion, when the first locking portion moves in the opposite direction of the gravity direction to unlock the plurality of first slots, the first elastic member is compressed.

6. The material loading device of claim 1, wherein the first locking portion further comprises a connecting strip, the plurality of blocks is disposed on the connecting strip, a region between adjacent two of the plurality of blocks forms one of the plurality of second slots.

7. The material loading device of claim 1, wherein the at least one opening comprises two openings, the at least one first locking mechanism is disposed at one of the two openings.

8. The material loading device of claim 7, further comprising at least one second locking mechanism disposed at one of the two openings away from the at least one first locking mechanism, wherein the at least one second locking mechanism is a manual locking mechanism, which is configured to manually open and close the one of the two openings away from the at least one first locking mechanism.

9. The material loading device of claim 8, wherein the at least one second locking mechanism comprises a second locking portion extending along the gravity direction, a first clamping groove disposed on the loading frame close to the at least one opening, and a second clamping groove disposed on the loading frame away from the at least one opening, the second locking portion is configured to clamp on the first clamping groove or the second clamping groove to lock or unlock the plurality of first slots.

10. The material loading device of claim 9, wherein the second locking portion comprises a locking rod extending along the gravity direction, a fixing member disposed at one end of the locking rod close to a top of the loading frame, a rotating shaft connected to the fixing member and the loading frame, a second elastic member sleeved on the rotating shaft, and a rotating portion disposed on one end of the locking rod close to a bottom of the loading frame, the rotating portion is rotationally connected to the loading frame, the fixing member is configured to drive the locking rod to rotate around the rotating shaft, thereby making the locking rod snap in the first clamping groove or the second clamping groove to lock or unlock the plurality of first slots.

11. The material loading device of claim 10, wherein the rotating portion and the locking rod are integrally formed.

12. The material loading device of claim 10, wherein the rotating portion is U-shaped.

13. The material loading device of claim 10, wherein the at least one second locking mechanism comprises two second locking mechanisms, the two second locking mechanisms are disposed on the one of the two openings away from the at least one first locking mechanism.

14. The material loading device of claim 1, further comprising a handle disposed on the loading frame.

\* \* \* \* \*